United States Patent [19]
Gill et al.

[11] Patent Number: 5,289,682
[45] Date of Patent: Mar. 1, 1994

[54] ARRANGEMENT OF A MASTER CYLINDER AND BRAKE BOOSTER

[75] Inventors: William R. Gill, Fremont, Ind.; Charles Wagner, Madison Heights; Michael H. Gulick, Waterford, both of Mich.

[73] Assignee: General Motors Corporation, Detroit, Mich.

[21] Appl. No.: 998,075

[22] Filed: Dec. 28, 1992

[51] Int. Cl.⁵ .............................................. B60T 13/00
[52] U.S. Cl. ..................... 60/547.1; 60/581; 91/376 R
[58] Field of Search ............... 60/547.1, 547.2, 549, 60/551, 557, 581, 565, 583; 91/376 R

[56] References Cited

U.S. PATENT DOCUMENTS

| | | | |
|---|---|---|---|
| 3,993,174 | 11/1976 | Williams et al. | 60/581 X |
| 4,047,765 | 9/1977 | Ulrich, Jr. | 60/581 X |
| 4,362,086 | 12/1982 | Runkle | 60/547.2 X |
| 4,819,996 | 9/1989 | Belart et al. | 303/114 |
| 4,955,197 | 9/1990 | Coleman et al. | 60/547.1 |
| 5,167,305 | 12/1992 | Cadeddu | 60/547.1 X |
| 5,184,468 | 2/1993 | Schonlau et al. | 60/547.1 |
| 5,195,421 | 3/1993 | Shinohara et al. | 60/547.1 |

Primary Examiner—Edward K. Look
Assistant Examiner—Hoang Nguyen
Attorney, Agent, or Firm—Ernest E. Helms

[57] ABSTRACT

An arrangement for a master cylinder and a vacuum booster for an automotive vehicle is provided including a vacuum booster having a first travel axis generally parallel with a travel axis of a vehicle and a housing for attachment to the vehicle, a master cylinder for fluidly actuating a braking system, the master cylinder having a piston slidably mounted along a second travel axis generally perpendicular to the first travel axis, a tubular enclosed conduit relay housing having a first end connected with the booster housing having a first opening and a second opening, the relay housing being connected with and supporting the master cylinder housing at a position spaced away from the vacuum booster housing, and a relay link pivotally mounted with respect to the relay housing by the pin, the relay link transmitting force between the booster and the master cylinder via first and second pivotally connected clevises.

2 Claims, 2 Drawing Sheets

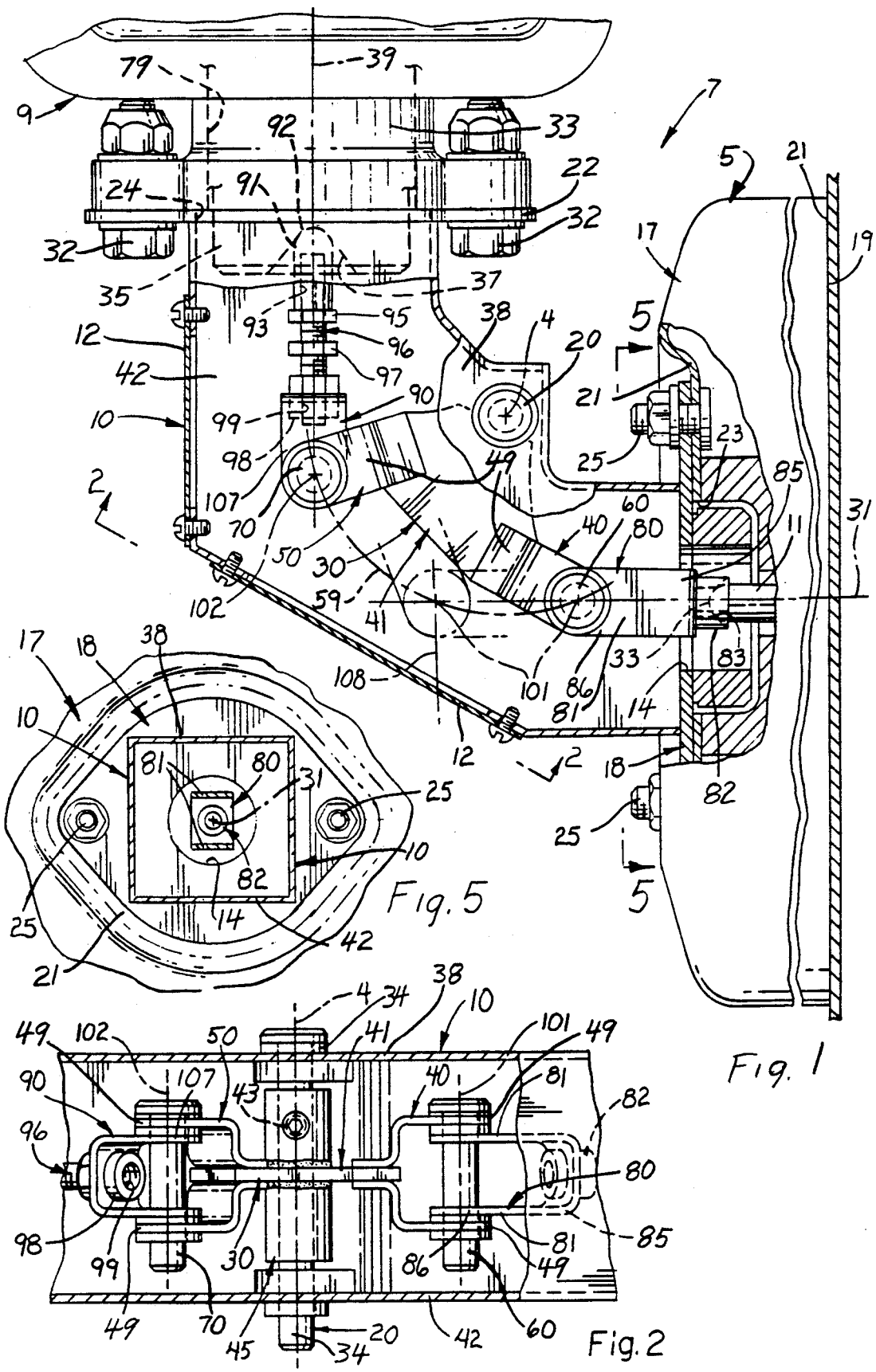

ARRANGEMENT OF A MASTER CYLINDER AND BRAKE BOOSTER

FIELD OF THE INVENTION

The field of the present invention is that of arrangements for master cylinders and boosters for automotive vehicles.

DISCLOSURE STATEMENT

Typical automotive vehicles have a brake booster attached to a fire wall which separates a passenger compartment of the vehicle from an engine compartment. Projecting forwardly from the booster is a master cylinder having its bore generally aligned with the axis of travel of the vehicle. For fuel economy, it is preferable to reduce the aerodynamic drag of the vehicle. One way to reduce aerodynamic drag is to lower the hood, thereby making the engine compartment smaller. Therefore, it would be beneficial to orient the master cylinder transverse to the vehicle axis with its bore generally parallel to the fire wall and to the ground.

SUMMARY OF THE INVENTION

It is an object of the present invention to provide a booster and master cylinder arrangement wherein the master cylinder is oriented transverse to the vehicle travel axis parallel to the fire wall, generally parallel to the ground. It is also an object of the present invention to provide a master cylinder booster arrangement as noted above which can be installed as a single unit or which can allow for replacement in the field of the booster or the master cylinder without compromising operational characteristics.

BRIEF DESCRIPTION OF THE DRAWINGS

FIG. 1 is a plan view with portions shown in section of a preferred embodiment of the present invention.

FIG. 2 is a view taken along line 2—2 of FIG. 1.

FIG. 5 is a view taken along line 5—5 of FIG. 1.

DETAILED DESCRIPTION OF THE INVENTION

Figure 3:
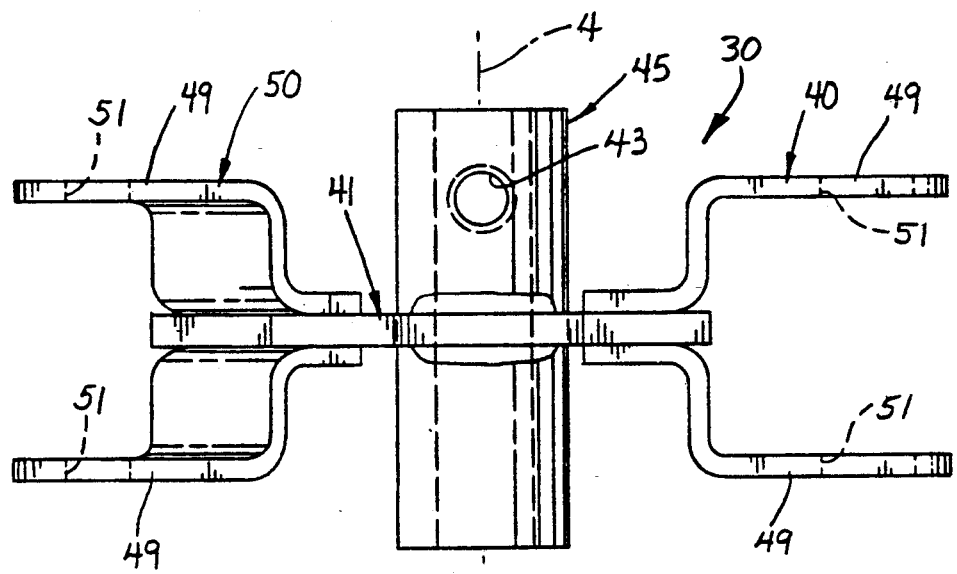
FIGS. 3 and 4 are a plan view and a side elevational view of a relay link utilized in the present invention.
Figure 4:
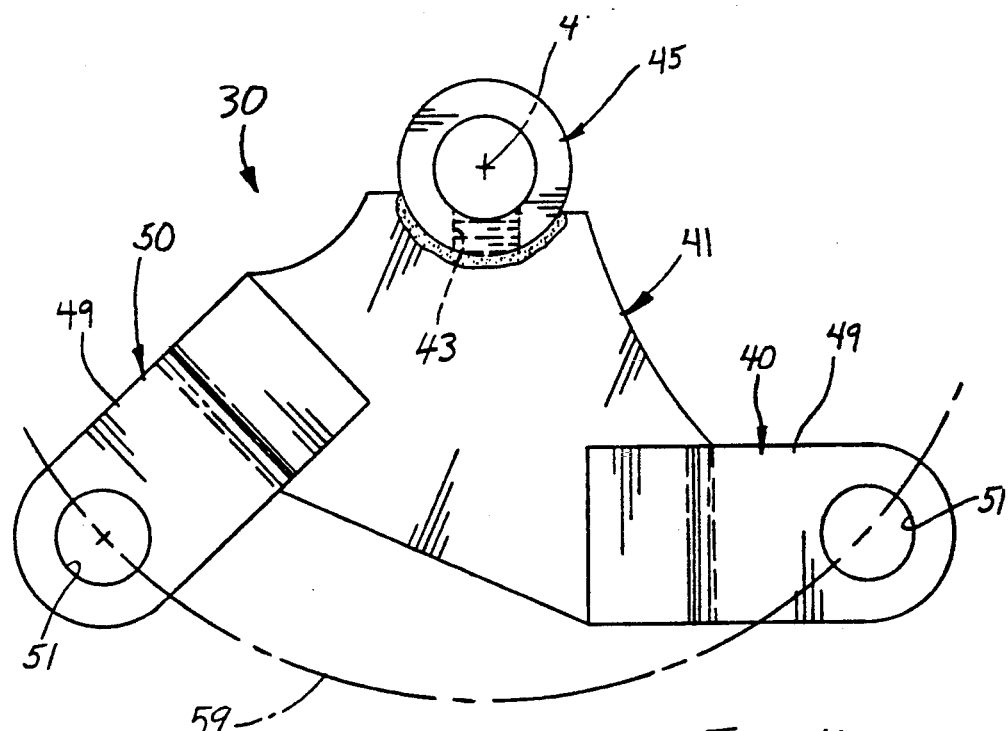

Referring to FIGS. 1 through 4, the present inventive arrangement 7 has a pneumatic vacuum booster 5 with a housing 17. The housing has a rearward end 19 joined to a fire wall 21 of the vehicle which separates the engine and passenger compartments from one another. The booster 5 is in the engine compartment. The housing 17 also has a forward end 21 with an opening 23. Protruding through the opening 23 is an output rod 11 which is actuated by a power piston (not shown) to move leftwardly to magnify the force input provided by a vehicle operator in order to actuate a master cylinder 9. The output rod 11 has a first travel axis 31 which is generally parallel aligned with the travel axis of the vehicle (except that it is typically pointed slightly upward). The output rod 11 has a tip with a rounded end 33.

To fluidly actuate a braking system (not shown), there is provided a master cylinder 9 having a housing 33. The housing has an interior bore 79 with a slidably mounted piston 35. The piston 35 has a second travel axis 39 and is also spring biased in a direction away from the housing 33. Additionally, the master cylinder has a cone 37 in its piston 35 for reception of compressive force transferring engagement.

Juxtaposed between the booster 5 and the master cylinder 9 is a tubular enclosed relay housing 10. The relay housing is a totally enclosed tubular member which prevents the entrance of foreign matter such as a misplaced tool or foreign matter carried by vermin (which can possibly get into an engine compartment from underneath a vehicle). The relay housing 10 has two removable panels 12 to allow entrance to the relay housing 10 for maintenance, adjustment or replacement.

A first opening 14 of the relay housing encircles the first travel axis 31. In like manner, a second opening 24 encircles the second travel axis 39. Referring additionally to FIG. 5, the relay housing 10 is mated with the booster 5 via a plate 18 which is attached to the booster via a series of studs 25. In like manner, a plate 22 connects the relay housing 10 with the master cylinder 9 via a series of connecting bolts and studs 32. The relay housing 10 also supports the master cylinder 9 at a position spaced away from the booster 5.

A relay pin means 20 is mounted to the housing 10 by two bearings 34 which are affixed or press fitted into the upper and lower surfaces 38 and 42, respectively, of the relay housing 10. A relay link 30 has a body portion 41 with two multi-membered arms 50 and 40 welded thereto. Additionally, the body 41 is welded to a cylindrical member 45 which, when installed, is encircled about pin 20. Cylindrical member 45 has an opening 43 to allow attachment by a set screw. However, other suitable attachment methods may be utilized. The pin 20 allows the relay link 30 to have a fixed pivotal axis 4 with respect to the relay housing 10.

As mentioned previously, the relay link 30 has two multi-fingered claws, or commonly referred to as arms, 40 and 50. Each arm has a bore 51 to allow insertion of a pin to the upper and lower fingers 49. The first arm 40 has a first pin 60 inserted therethrough, and the second arm 50 has a second pin 70 inserted therethrough. Press fitted within the bores 51, the upper and lower fingers of the arms 40 and 50 are bearings which mount the respective pins 60, 70. The first and second pins 60, 70 are connected at 90 degree angles from one another and rotate on a common radius 59.

Pivotally connected with the upper and lower fingers 49 of the arm 50 via the pin 60 is a first clevis 80. The first clevis 80 transmits force from the push rod 11 to the relay link 30. The first clevis has a first end 85 which has a stud portion 82 with a conical seat 83 for reception of a rounded end 29 of the push rod 11. The conical seat 83 provides a pivotal mounting of the first clevis 80. The first clevis 80 also has two fingers 81 which are fixably connected with the stud portion 82. The second end 86 has press fitted therein two bearings which facilitate the pivotal connection to the first relay pin 60, thereby providing a pivotal axis 101 between the relay link 30 and the first clevis 80 which is fixed with respect to the relay link 30 and first clevis 80.

The clevis 80 and the output rod end 33 are under continuous loading. The combination of the continuous loading and the conical seat prevents any disengagement due to side loading.

Between the master cylinder 9 and the arm 50 there is provided a second clevis 90. Second clevis 90 has a first end alpha portion 91 which has a rounded tip 92 mounted within the cone 37 of the master cylinder piston to provide pivotal mounting with respect to the master cylinder piston. The first end alpha portion 91 also is provided with an internal threaded bore 93 threaded in a first hand (as shown) left-hand orientation. Threadably inserted within the bore 93 is a threaded rod 96. The threaded rod 96 has a torsion nut means provided by a fixably connected nut 97 (or as an alternative, a flat machine on the rod 96) to allow torsional rotation of the threaded rod 96.

On the second clevis 90, the first end beta portion is comprised of a stud member 98 which also has an internal threaded bore 99. The orientation of the threaded bore 99 is opposite that of the threaded bore 93. Therefore, rotation of the threaded rod 96 by the nut 97 in one direction lengthens the second clevis 90, and rotation in a second direction diminishes the length of the second clevis 90. A set nut 95 is threadably engaged with the rod 96. After adjustment of the length of the second clevis 90, the set nut 95 is rotated to abut the alpha portion 91 to lock the adjusted length of the second clevis 90. The second clevis upper and lower fingers 49, in a manner similar to that previously described for the first clevis, have bearings which pivotally mount a second end 107 to the second relay pin 70 providing a fixed pivotal connected between the second clevis 90 and the second arm 50.

In operation, the vehicle operator will actuate the booster 5, which will cause the output rod 11 to move along its first axis 31. In its initial position, the orientation of the first clevis 80 will be generally aligned with the first travel axis 31, and the pivotal axis 101 between the first clevis 80 and the arm 40 will also intersect the axis 31. In like manner, the pivotal axis 102 between the second clevis 90 and the arm 50 will be aligned with the axis 39.

Full actuation of the booster to the position shown in phantom will cause the pivotal center lines 101 and 102 to deviate outwardly from their respective travel center lines and then reintersect at the point of maximum application 108. Therefore, the maximum deviation from the travel center line will approximately be at the midpoint of the application. The limits of travel of the master cylinder piston 35 may be adjustably set to compensate for manufacturing tolerances. A lengthening of the second clevis 90 will cause the master cylinder booster to actuate its travel at a position further away from the second opening 24 of the relay housing, and a reduction of the length of the second clevis 90 allows the master cylinder piston 35 travel to be actuated from a initial start position closer to the opening 24. Therefore, the piston can be set in relation to its respective bypass and compensating ports (not shown). The above-described adjustment may occur in the factory or it may occur in the field by removal of the cover 12.

While an embodiment of the present invention has been explained, it will be readily apparent to those skilled in the art of the various modifications which may be made to the present invention without departing from the spirit and scope of this application as it is encompassed by the following claims.

The embodiments of the invention in which an exclusive property or privilege is claimed are defined as follows:

1. An arrangement for a master cylinder and a vacuum booster for an automotive vehicle comprising:

a vacuum booster magnifying a force input of a vehicle operator, the booster having a force output rod having a first travel axis generally parallel with a travel axis of the vehicle, and the booster having a housing for attachment to the vehicle;

a master cylinder for fluidly actuating a braking system, the master cylinder having a housing with a piston slidably mounted therein, the master cylinder piston having a second travel axis generally perpendicular to the first travel axis;

a tubular enclosed conduit relay housing having a first end connected with the booster housing, the relay housing having a first opening encircling the first travel axis and a second opening encircling the second travel axis, the relay housing being connected with and supporting the master cylinder housing at a position spaced away from the vacuum booster housing;

relay pin means mounted within the relay housing;

a relay link pivotally mounted with respect to the relay housing by the pin means, the relay link being encircled within the relay housing and having first and second arms on a common radius from the relay pin means for transmitting force between the booster and the master cylinder;

first pin means mounted on the first arm;

second pin means mounted on the second arm;

a first clevis means encircled within the relay housing, the first clevis means having a first end for compressive force transmittal engagement with the booster output rod and for pivotal mounting with respect to the booster output rod, and the first clevis means having a second end pivotally connected with the first pin means providing a third pivotal axis between the first clevis and the first arm being fixed with respect to the first arm and the first clevis means;

a second clevis means encircled by the relay housing, the second clevis having a second end pivotally connected to the second pin means to provide a fixed fourth pivotal axis with the second arm, the second clevis having a first end alpha portion having an internal threaded bore of a first hand thread, the second clevis also having a threaded rod threadably inserted within the first end alpha portion, and the second clevis first end having a beta portion pivotally mounted with respect to the master cylinder piston, the first end beta portion having an internally threaded bore for receiving the threaded rod, the threads of the first end beta internal bore being of an opposite hand of the first end alpha internal bore, and the second clevis having torsion nut means on the threaded rod to facilitate rotation of the same to selectively adjust the distance between the alpha and beta portions of the second clevis first end to set the limits of travel of the master cylinder piston.

2. An arrangement as described in claim 1 further comprising a lock nut on the rod for making contact with a portion of the second clevis first end, thereby restraining rotation of the rod and locking the adjustment of the length of the second clevis.

* * * * *